United States Patent
Yamaguchi

[11] Patent Number: 5,934,587
[45] Date of Patent: Aug. 10, 1999

[54] FISHING REEL WITH AN OPERATION BODY INCLUDING CORK MATERIAL

[75] Inventor: Nobuyuki Yamaguchi, Tokyo, Japan

[73] Assignee: Daiwa Seiko, Inc., Tokyo, Japan

[21] Appl. No.: 08/908,952

[22] Filed: Aug. 8, 1997

[30] Foreign Application Priority Data

| Aug. 8, 1996 | [JP] | Japan | 8-209885 |
| May 27, 1997 | [JP] | Japan | 9-136727 |

[51] Int. Cl.⁶ ............................................. A01K 89/00
[52] U.S. Cl. ............................................................ 242/283
[58] Field of Search ................................. 242/283, 284, 242/322, 323; 16/116, 118, 121, DIG. 38

[56] References Cited

U.S. PATENT DOCUMENTS

| 1,328,696 | 1/1920 | Smith | 242/284 |
| 2,525,169 | 10/1950 | Dodge | 242/323 |
| 4,167,828 | 9/1979 | Sarah | 43/20 |
| 4,373,718 | 2/1983 | Schmidt | 273/75 |
| 4,657,201 | 4/1987 | Munroe | 242/265 |
| 4,698,893 | 10/1987 | Camacho et al. | 29/460 |
| 4,983,667 | 1/1991 | Bagdasarian | 524/703 |
| 5,138,791 | 8/1992 | Coes | 43/53.5 |
| 5,150,853 | 9/1992 | Bernard et al. | 242/283 |
| 5,239,768 | 8/1993 | Michishita | 43/23 |
| 5,372,325 | 12/1994 | Uehara et al. | 242/322 |
| 5,577,678 | 11/1996 | Murayama | 242/283 |
| 5,797,554 | 8/1998 | Atherton et al. | 242/316 |

FOREIGN PATENT DOCUMENTS 61-118251 7/1986 Japan .

*Primary Examiner*—John P. Darling
*Attorney, Agent, or Firm*—Sughrue, Mion, Zinn, Macpeak & Seas, PLLC

[57] ABSTRACT

An operation knob attached to the rotation tip of a handle arm in a spool operation handle of a fishing reel comprises a main body member made of a cork material, and coated on at least these surfaces exposed to the outside with a waterproof film. With such operation knob, a fishing reel can enhance operability of operation bodies and portability of the reel, provides a good touch feeling, and can be used without any problem even in a harsh environment in which water is easily deposited, for example.

8 Claims, 6 Drawing Sheets

FISHING REEL WITH AN OPERATION BODY INCLUDING CORK MATERIAL

BACKGROUND OF THE INVENTION

This invention relates to a fishing reel for winding a fishing line, such as a bait casting reel or a spinning reel, and in particular to a fishing reel having an operation body such as a knob on a lever for operating a moving member.

Generally, in a fishing reel, a spool is rotated to wind a fishing line thereon by rotating a handle arm attached rotatably to the reel main body. To facilitate the rotation operation of the handle arm, an operation knob is placed at the rotation end of the handle arm and is grasped with the user's fingers. Hitherto, the whole main body of the knob attached to the handle arm has been molded in one piece with a material such as an ABS resin, rubber, or a compregnated wood (for example, refer to Japanese Utility Model Laid-Open No. Sho 61-118251).

In recent years, reduction in the overall weight has been demanded for the reel from the viewpoints of winding operability and release operability of a fishing line and portability. The conventional knob is entirely made of a resin material, a rubber material, etc., and thus becomes heavy. The specific gravities of the ABS resin, compregnated wood, and rubber are 1.05, 1.3, and 1.25 respectively. Further, the knob is manufactured comparatively large so that it can be grasped easily; consequently, the operation handle as a whole becomes fairly heavy.

The handle arm is made long and a heavy knob is attached to the distal end of the long handle arm. Thus, the rotational inertia of the whole handle increases and the rotation operability of the handle is lowered, particularly in the fishing line winding operation. Also, it is difficult to wind a fishing line while finely adjusting the winding speed.

The weight balance of the whole reel unit is also adversely affected and the total operability of the reel unit is degraded when the operation handles described above are used.

Further, a knob made of a rubber material is comfortable in the hand, but the material is too soft. When the knob is grasped with the user's fingers for winding a fishing line, it becomes easily deformed, worsening the fishing line winding operability.

A natural cork material, also called a cork material, is known as a fishing reel grip. It has a fairly small specific gravity of 0.15–0.18 and also has a reasonable strength in a dry state; it is one material appropriate for reducing the weight of a knob. If a cork material is worked singly to a knob shape and a shaft body is attached thereto, the weight is reduced to about one sixth to one eighth as compared with a resin or rubber material of the same shape, resulting in remarkable weight reduction.

However, if a cork material is used singly, a problem arises in the strength when the knob made of the cork material is fixed to a shaft body or is rotated, and there is the fear of breakage in long-term use. To solve this problem, for example, the cork material may be fixed to an aluminum pipe with an adhesive for reinforcement. Resultantly, it becomes somewhat heavy as compared with the single use of the cork material, but the weight is reduced to about one third to one fifth as compared with a resin or rubber material of the same shape.

If the cork material is manufactured so as to directly touch the hand in use, a good feeling is provided and weight reduction can be attained.

However, if the cork material absorbs a moisture content and becomes soft during the use, or if grease or oil adheres to the cork material and the cork material becomes soft, the strength drastically diminishes and the cork material cannot stand long-term use as a knob. Thus, the cork material is hard to adopt for the knob main body.

Such problems also apply to operation bodies such as a clutch lever and a stop lever for fishing reels. Accordingly, it desired to solve these problems.

SUMMARY OF THE INVENTION

It is therefore an object of the invention to provide a fishing reel which enhances operability of such operation bodies and improves portability of the reel, provides a good touch feeling, and can be used without problems even in a harsh environment in which water is easily deposited, for example.

To this end, according to the invention, there is provided a fishing reel comprising an operation body attached to a moving member attached displaceably to a reel main body, the operation body comprising a main body member made of a cork material and coated with a protective film at least on an exterior, exposed surface.

According to the invention, there is also provided a fishing reel comprising an operation body attached specifically to a handle arm in an operation handle of a line winding spool, the operation body comprising a main body member made of a cork material and coated with a protective film at least on an exterior, exposed surface.

Further, according to invention, the operation body may be mounted detachably on the moving member, which is attached displaceably to the reel main body by removable attachment means.

Since the main body member of the operation body is made of a cork material, the operation body can be reduced in weight. Since the cork material has a small specific gravity of about 0.15, the operation body which generally needs to be thick is drastically weight-reduced. During the operation of a moving member provided with such an operation body, the operation balance becomes improved. Particularly for the operation body attached to the distal end of the rotating handle arm, the inertia moment of the whole moving part is decreased, thus the operability is enhanced, work such as fine operation or adjustment becomes stable, and easy handling is enabled. Further, the whole weight balance of the fishing tool is well affected and the operability of the fishing reel is greatly improved. The main body member made of a cork material is coated with resin, etc., whereby the surface of the main body member is protected. Thus, damage to the main body member, such as expansion or breakage, is prevented, enhancing durability of the operation body, even in a bad operating environment wherein water, etc., is poured on the operation body, for example. Further, the main body member is made of the cork material, whereby when the user grasps the main body member with his or her fingers, it has a good feeling and hard does not to slip; the fishing reel operability is also enhanced from this point.

DETAILED DESCRIPTION OF THE PREFERRED EMBODIMENTS

First Embodiment

Figure 1:
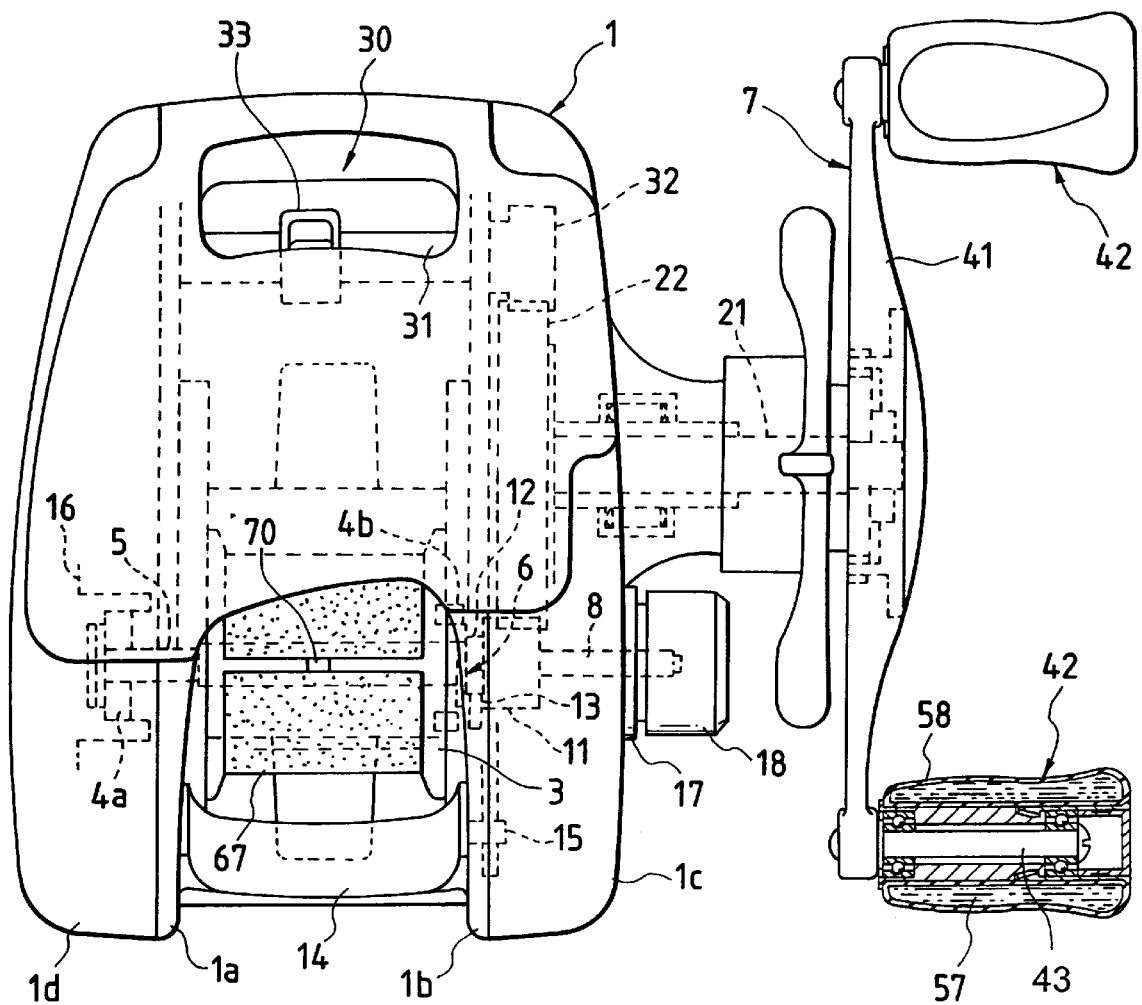
FIG. 1 is an illustration to show a schematic structure of a bait casting fishing reel according to a first embodiment of the invention.

An example of a fishing reel according to a first embodiment of the invention will be discussed with reference to FIGS. 1 to 5. As shown in FIG. 1, a reel main body (fishing tool main body) 1 of a bait casting fishing reel unit comprises left and right frames 1a and 1b and a spool 3 for winding a fishing line is disposed between the left and right frames 1a and 1b. The spool 3 is integrated with a spool shaft 5 supported at left and right ends rotatably by bearings 4a and 4b disposed on the left and right frames 1a and 1b. A known clutch mechanism 6 is placed in a part at one end (right end) of the spool shaft 5. When the clutch mechanism 6 is in a connection state, a drive force provided by rotating a handle 7 is transferred to the spool shaft 5; when the clutch mechanism 6 is in a release state, the drive force is shut off.

A shaft 8 coaxial with the spool shaft 5 is disposed at one end of the spool shaft 5 and a pinion 11 is fitted into the shaft 8 movably in rotation and axial directions. The spool shaft 5 is provided at one end with an engagement outer periphery noncircular in cross section (not shown) engaged in and disengaged from an engagement hole noncircular in cross section (not shown) made in one end of the pinion 1. The pinion 11 is supported movably along the axial direction of the shaft 8 so that it can rotate independently of the spool shaft 5 and can be engaged in and disengaged from the engagement outer periphery. The clutch mechanism 6 is formed so as to engage and disengage the spool shaft 5 and the pinion 11 by moving the pinion 11 in the axial direction thereof.

A circumferential groove 12 is formed in the outer periphery of one end of the pinion 11 and the tip of a clutch operation plate 13 is fitted into the circumferential groove 12. The clutch operation plate 13 is operated so as to move left and right indirectly by a clutch operation lever 14 as a clutch switch member. This means that the clutch operation plate 13 receives motion of the clutch operation lever 14 for axially moving the pinion 11 for engaging or disengaging a clutch engagement part of the clutch mechanism 6.

The clutch operation lever 14 is placed behind the spool 3 between the left and right frames 1a and 1b of the reel main body 1. It is coupled to the clutch operation plate 13 via a member such as a pin 15 described later.

The spool shaft 5 is provided at the other end with a backlash prevention device 16 from preventing the spool 3 for overrotating for preventing a backlash when a fishing line is released. The backlash prevention device 16 is formed as a magnetic type. That is, it comprises a conductive ring body (not shown) attached to the spool shaft 5 and rotating in conjunction with the spool 3 as one piece and a pair of magnets (not shown) with N and S poles facing each other with the conductive ring body between. According to the configuration, when the spool 3 rotates, an eddy current occurs in the conductive ring body rotating in a magnetic field and a rotation braking force occurs in the opposite direction to the rotation direction of the conductive ring body according to the Fleming's left-hand rule, braking the spool shaft 5, namely, the spool 3. Thus, when the spool 3 attempts to overrotate, the rotation of the spool 3 is braked, so that a backlash of the spool 3 is prevented. Such a backlash prevention device may alternatively be a device wherein a frictional force acts because of a centrifugal force for applying a brake.

As a backlash prevention device, a braking mechanism for giving a frictional force to the end face of the spool shaft 5 for applying a brake is built in the reel unit. That is, the shaft 8 penetrating the pinion 11 axially and placed coaxially with the spool shaft 5 is engaged at one end with the spool shaft 5 in one piece or by abutment and reaches at the other end the inside of a pipe 17 disposed in a side wall of a projection cover 1c formed in the right frame 1b of the reel main body 1. A pressing adjustment knob 18 like a cap threadably engages the pipe 17 and the tip of the shaft 8 is abutted against the inner face of the pressing adjustment knob 18. The spool shaft 5 is abutted at the other end against a friction plate (not shown) disposed in a projection cover 1d formed in the left frame 1a of the reel main body 1. The screwing-in amount of the pressing adjustment knob 18 is adjusted by manual operation, whereby for the shaft 8, one end of the spool shaft 5 is pressed against the friction plate via the spool shaft 5 for adjusting the rotation braking force of the spool 3. This braking device may be a device for acting from the left frame 1a to the spool shaft 5.

On the other hand, a drive gear 22 attached to one end of a handle shaft 21 of the handle 7 meshes with the pinion 11. When the clutch mechanism 6 is on (the spool shaft 5 and the pinion 11 engage each other), the handle 7 is rotated, whereby the spool 3 is rotated through the drive gear 22 and the pinion 11. When the clutch operation plate 13 is operated by handling the clutch operation lever 14 and the clutch mechanism 6 is turned off (the spool shaft 5 and the pinion 11 disengage each other), the spool shaft 5 of the spool 3 can be rotated freely and enters a fishing line release state. In this case, the pinion 11 enters a state independent of the spool shaft 5. Thus, if the spool 3 enters the fishing line release state and the spool shaft 5 rotates, no load is imposed on the spool shaft 5.

A fishing line wound around the spool 3 is released and wound through a level wind device 30. For this level wind device 30, a gear 32 meshing with the drive gear 22 is disposed at one end of a shaft 31 placed in parallel with the spool shaft 5 and a known line guide slipper 33 is attached to the shaft 31. When the handle 7 is rotated, the line guide slipper 33 is moved left and right matching rotation of the spool 3 for evenly winding the fishing line around the peripheral surface of the barrel of the spool 3.

Next, the operation bodies such as knobs and levers in the bait casting fishing reel will be discussed.

First, the spool operation handle 7 will be discussed. It has a handle arm 41 as a moving member attached to one end of the handle shaft 21 and a knob 42 as an operation body is attached to the rotation tip of the handle arm 41 at right angles to the handle arm 41. The knob 42 is rotatably mounted on a shaft body 43 attached to the rotation tip of the handle arm 41 by cantilever support.

Figure 2:
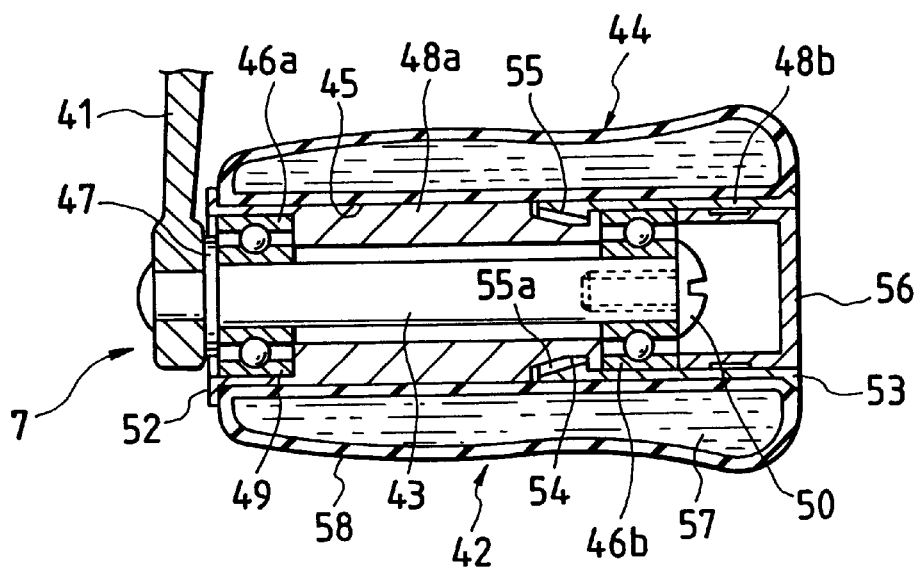
FIG. 2 is an enlarged sectional view of the part of an operation knob of a spool operation handle of the bait casting fishing reel according to the first embodiment of the invention.

The knob 42 as an operation body has a structure as shown in FIG. 2. It has a knob main body 44 shaped substantially like a comparatively thick pipe and the shaft body 43 is inserted into an inner hole 45 of the knob main body 44. The knob main body 44 is attached rotatably through a pair of bearings 46a and 46b fitted into the shaft body 43 and collar members described later. The first bearing 46a is attached at a position on the base end side of the shaft body 43 and is abutted against a flange 47 formed in the base end part of the shaft body 43 for positioning. The second bearing 46b is attached at a position at the tip of the shaft body 43.

The collar members fitted into the inner hole 45 of the knob main body 44 are two members of a first collar 48a and a second collar 48b. These collars 48a and 48b are made of resin. The knob main body 44 is attached rotatably to a pair of bearings 46a and 46b fitted into the shaft body 43 with the collars 48a and 48b as media. The first collar 48a is fitted in the outer periphery of the first bearing 46a positioned on the base end side of the shaft body 43 and the second collar 48b is fitted in the outer periphery of the second bearing 46b positioned on the tip side of the shaft body 43.

A step 49 engaging the first bearing 46a is made in the base end inner face of the first collar 48a. The first collar 48a also serves as a position restriction member intervening between the bearings 46a and 46b for defining the distance between the bearings 46a and 46b. A slip-out prevention screw 50 for receiving the second bearing 46b at the top is threadably attached to the tip of the shaft body 43. On the shaft body 43, the first collar 48a and a pair of bearings 46a and 46b are sandwiched between the flange 47 of the shaft body 43 and the top of the screw 50 so as not to slip out in a positioning state.

A collar 52 outward rising and bent is formed on the outer peripheral margin of the base end of the first collar 48a. It comes in intimate contact with the base end opening margin in the inner hole 45 of the knob main body 44 and is hooked in one end of the knob main body 44.

A collar 53 is formed on the outer peripheral margin of the tip of the second collar 48b. It comes in intimate contact with the outer end opening margin in the inner hole 45 of the knob main body 44 and is hooked in the knob main body 44 for preventing the knob main body 44 from skipping out.

Further, the first collar 48a and the second collar 48b engage each other and are coupled in the inner hole 45 of the knob main body 44. That is, an engagement groove 54 is formed on the outer periphery of the tip of the first collar 48a and a projection 55 inward projecting is formed at the base end of the second collar 48b. A plurality of slots for providing elasticity are formed on the peripheral margin containing the projection 55. The projection 55 is hooked in the engagement groove 54 for coupling the first collar 48a and the second collar 48b. The inner peripheral surface on the opening end side forming the projection 55 of the second collar 48b is shaped like a taper. This slope forms a guide face 55a. When the second collar 48b is inserted into the inner hole 45 of the knob main body 44 along the guide face 55a, the projection 55 is guided into the engagement groove 54 climbing over the outer peripheral margin of the tip of the first collar 48a.

A blind hole decorative cap 56 is fitted into the outer end opening part of the second collar 48b.

The knob main body 44 has the following special structure:

It is made of a main body member 57 made substantially like a comparatively thick pipe with the outer peripheral surface formed like a proper predetermined shape with a cork material and the outer surface of the main body member 57 is coated with a protective film 58 on the whole.

Resin or rubber is used as a material of the protective film 58. The resin may be rigid or flexible resin and the material quality is not limited; for example, a urethane resin, a styrene resin, etc., is available. The rubber can be natural or synthetic rubber or may be vulcanized or non-vulcanized rubber; for example, urethane rubber, EPDM rubber, etc., is available.

The protective film 58 may have a thickness to a degree that it is made water repellent; normally, the protective film has a thickness of 0.2 mm to 2 mm and preferably about 0.5 mm.

Here, a process of coating the main body member 57 with the protective film 58 will be simply discussed.

A cork material is worked by cutting, drilling, etc., to a before-molding shape that can be coated. After this, a special hole filler is rubbed into pores contained in the cork material and is dried, then the excessive hole filler is removed, then an adhesive is applied to the surface and is dried for making a before-molding main body member.

On the other hand, for the protective film 58, a material worked to a resin film 0.5 mm thick is used to prepare a half film of almost the same shape as a molded material by vacuum molding or blow molding or a half film is provided by injection molding from a resin pellet. Further, as a material used for the inner hole 45 of the knob main body 44, a resin film 0.5 mm thick is cut to a shape coming in contact with the full face of the inner hole or is extruded to a pipe shape 0.5 mm thick having the same inner diameter as the inner hole and is cut.

A half film is placed on a female mold molding face of a molding die (not shown) and a resin coating film is rounded and entered in the inner hole of the main body member 57. A molding core (not shown) is inserted to a predetermined position and is set on the molding die. The half film is put on the top and a male mold is put on it for molding by a generally known method. After heating and cooling, the product is taken out from the molding die to complete the coating.

The full face of the main body member 57 made of the cork material is thus coated with resin, etc., whereby the surface of the main body member 57 is protected and the effects of resistance to water, oil, etc., are produced. Even in a bad operating environment, swelling and softening of and damage to the main body member 57 are prevented, enhancing durability of the knob 42.

The knob 42 of the handle 7 is made of the cork material, whereby when the user grasps the knob with his or her fingers, it has a good feel and does not slip, enhancing the fishing line winding operability. Since the cork material has a small specific gravity of about 0.15, the knob 42 of the handle 7 is comparatively very light and the rotation balance of the handle 7 is improved. Particularly, the knob 42 attached to the rotation tip of the handle arm 41 is rendered light, thus displacement relative to the reel main body 1, namely, the rotational inertia of the whole handle 7 rotating lessens and the rotation balance of the handle 7 is improved. Particularly, the rotation operability of the handle in the fishing line winding operation is improved and fine adjustment of the winding speed is facilitated. Further, the weight balance of the whole reel is well affected, enhancing the total reel operability.

On the other hand, to attach the knob main body 44 to the shaft body 43, the first collar 48a and the second collar 48b are inserted into the inner hole 45 of the knob main body 44 from the opposite sides and are abutted, engaged, and coupled in the inner hole 45 as a unit. At this time, they may be further bonded and fixed. Next, the first bearing 46a is fitted onto the shaft body 43, then the unit is fitted onto the shaft body 43 and the second bearing 46b is fitted onto the shaft body 43. The screw 50 is screwed into the shaft body 43 to fix the unit. Last, the blind hole decorative cap 56 is fitted into the outer end opening part of the second collar 48b for assembly.

To remove the knob 42, the above-described procedure may be reversed. The knob 42 is mounted detachably by removable attachment means, thus can be attached and detached easily and can also be replaced with another piece or a different kind of piece. It can also be repaired or replaced easily.

As an alternative method of attaching the knob main body 44 to the shaft body 43, a pair of bearings 46a and 46b are previously attached to the shaft body 43 and first the first collar 48a is fitted onto the shaft body 43, next the knob main body 44 is fitted onto the first collar 48a. After this, the second collar 48b is inserted into the inner hole 45 of the knob main body 44 and is engaged in the first collar 48a in the inner hole 45 of the knob main body 44. After they are screwed with the screw 50, the blind hole decorative cap 56 is fitted into the second collar 48b and hooked, thereby completing the assembly. Other various assembly methods are possible.

Figure 3:
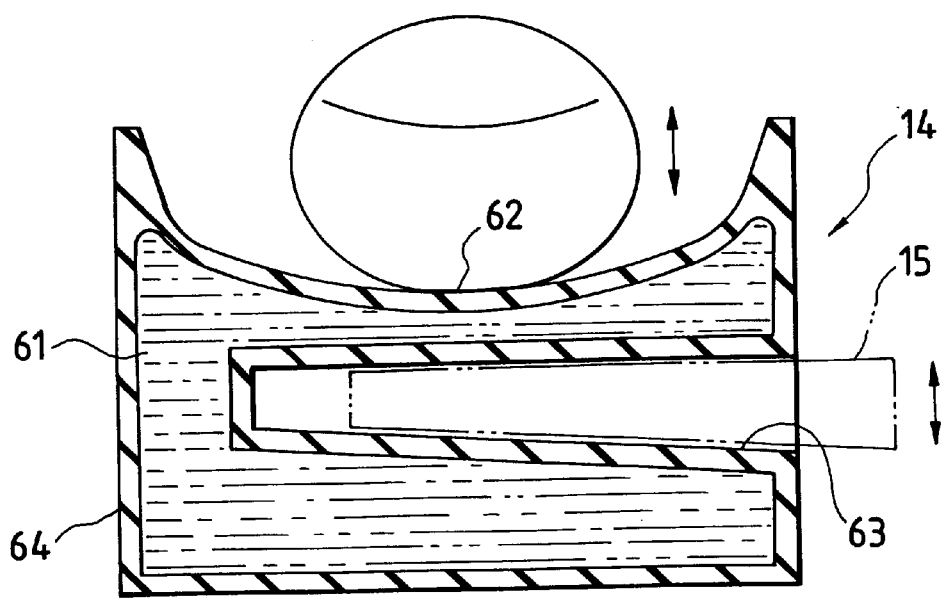
FIG. 3 is an enlarged sectional view of the part of a clutch operation lever of the bait casting fishing reel according to the first embodiment of the invention.

The structure of the clutch operation lever 14 of the clutch mechanism 6 will be discussed as another example of the operation bodies. As shown in FIG. 3, a lever main body member 61 of the clutch operation lever 14 is formed thick with a cork material and its outer peripheral surface is formed to a proper predetermined shape. A finger touch recess 62 is made in the upper face portion of the lever main body member 61. The lever main body member 61 is formed in the right side face part with a taper-like hole 63 into which a taper-like pin 15 for operating the clutch operation plate 13 of the clutch mechanism 6 is inserted. The clutch operation lever 14 is operated so as to move in the arrow directions shown in FIG. 3.

Further, all the outer surface of the lever main body member 61 made of the cork material including the inside portion of the holes 64 is coated with a waterproof film 64. Resin, rubber, etc., as with the knob main body 44 of the knob 42 is used as a material of the film 64. Of course, the film 64 may also have a thickness to a degree that it is made water repellent; normally, the film is made thick 0.2 mm to 2 and preferably about 0.5 mm.

Figure 4:
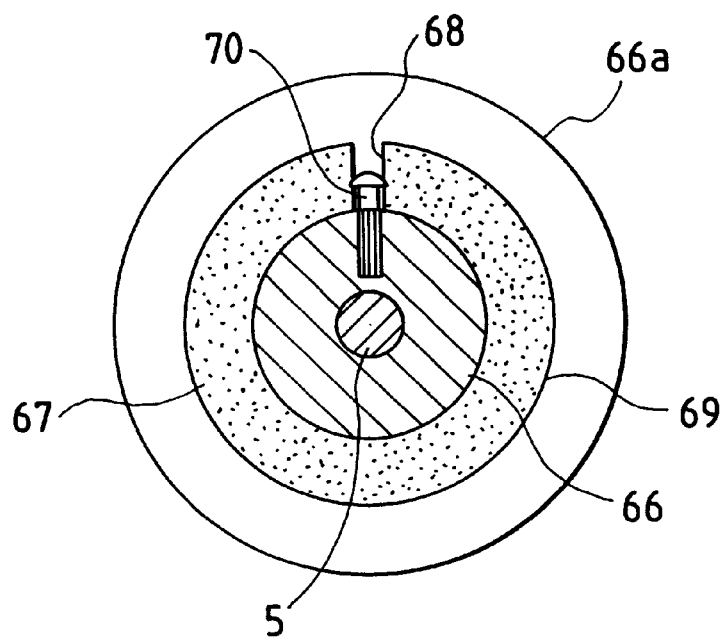
FIG. 4 is a transverse sectional view of the part of a spool of the bait casting fishing reel according to the first embodiment of the invention.
Figure 5:
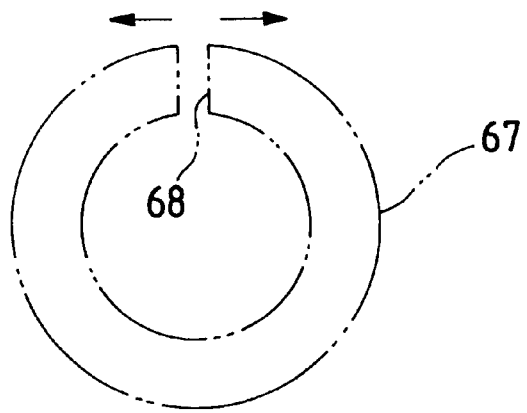
FIG. 5 is a phantom transverse sectional view of the part of the spool of the bait casting fishing reel according to the first embodiment of the invention.

As shown in FIG. 4, the spool 3 comprises a fishing line winding barrel 66 and a flange 66a formed at both ends of the barrel. The fishing line winding barrel 66 has a comparatively small diameter to allow the maximum amount of fishing line normally used to be wound. However, in the actual use, often the maximum amount of fishing line is not required. Then, if a reasonable amount of fishing line is only required, a spool spacer 67 mounted detachably on the fishing line winding barrel 66 is used to lessen the dead fishing line amount. As shown in FIGS. 4 and 5, the spool spacer 67 comprises a pipe-like spacer main body 69 with a slit 68 made in the axial direction. The spacer main body 69 is made of a cork material. The slit 68 is widened in the arrow directions shown in FIG. 5 so that the spool 3 can be attached to or detached from the fishing line winding barrel 66. After attachment, the spool spacer 67 comes in intimate contact with the fishing line winding barrel 66 because of elastic restorability of the spool spacer 67 and by a fishing line winding force. A pin 70 is screwed in the fishing line winding barrel 66 and is engaged in the part of the slit 68 of the spool spacer 67 for preventing rotation. The outer surface of the spacer main body 69 may be coated with a waterproof film as with the above-described operation body.

If the spool spacer 67 comprising the spacer main body 69 made of the cork material is used, the weight increases only a little, the moment of inertia acting on the spool 3 equipped with fishline is lessened, and the fishing line release property becomes good. Also, the jam amount of fishing line released is decreased for improving the fishing line release property, enhancing the fly distance and cast control, etc. Since the number of fishing line wind layers is small, the line winding state in the axial direction of the fishing line outer periphery becomes good, the rotation balance of the spool 3 becomes good, and occurrence of noise at the high-speed rotation time of the spool 3 when a fishing line is released (casting noise) is suppressed.

Second Embodiment

Figure 6:
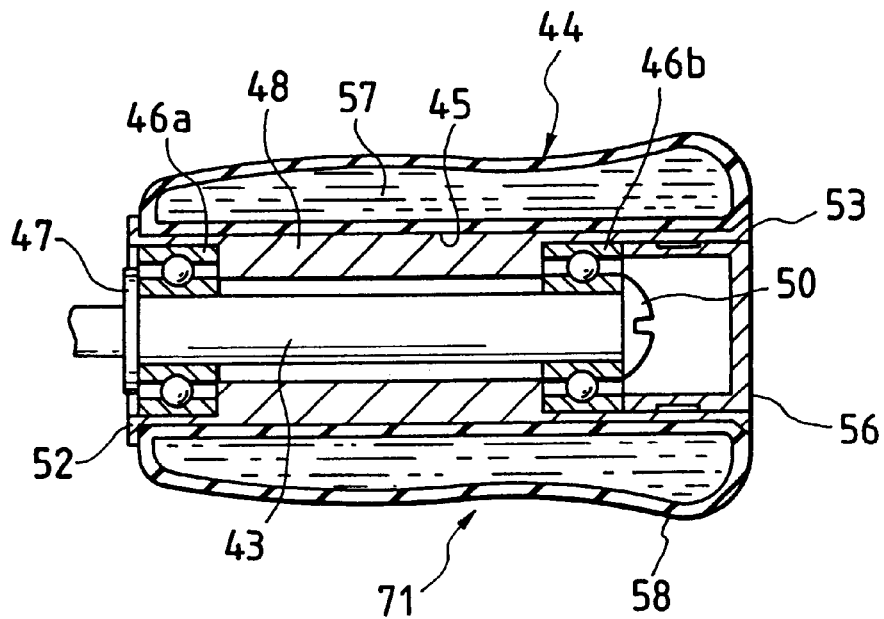
FIG. 6 is an enlarged sectional view of the part of an operation knob of a spool operation handle of a bait casting fishing reel according to a second embodiment of the invention.

A spool operation handle of a bait casting fishing reel according to a second embodiment of the invention will be discussed with reference to FIG. 6. A knob 71 of the spool operation handle is a modified example of the knob 42 in the first embodiment. The knob 71 differs from the knob 42 in that a single collar member 48 is fitted into an inner hole 45 of a knob main body 44. This means that the first collar 48a and the second collar 48b in the first embodiment are formed continuously for simplifying the structure. Other components are similar to those of the first embodiment and therefore will not be discussed again.

Third Embodiment

Figure 7:
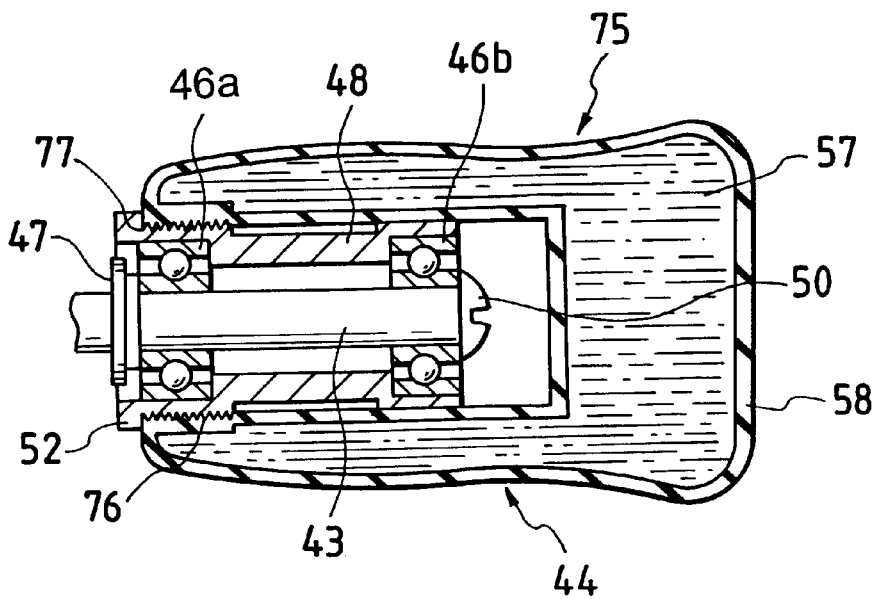
FIG. 7 is an enlarged sectional view of the part of an operation knob of a spool operation handle of a bait casting fishing reel according to a third embodiment of the invention.

A spool operation handle of a bait casting fishing reel according to a third embodiment of the invention will be discussed with reference to FIG. 7. A knob 75 of the spool operation handle is also a modified example of the knob 42 in the first embodiment. The knob 75 differs from the knob 42 in that an inner hole 45 of a knob main body 44 is not opened at the tip and is shaped like a cap. A female screw 77 that can be screwed in a male screw 76 formed in the base end outer periphery of a collar member 48 is formed in the inner face of an opening in the inner hole 45 of the knob main body 44. Like the collar member 48 in the second embodiment, the collar member 48 is a single body. Other components are similar to those of the first embodiment and therefore will not be discussed again. According to the third embodiment, only the knob main body 44 can be attached and detached solely and thus is convenient for replacement thereof. A blind hole decorative cap 56 as described above is not required and the handle operation knob 75 of a simple appearance can be provided.

Fourth Embodiment

Figure 8:
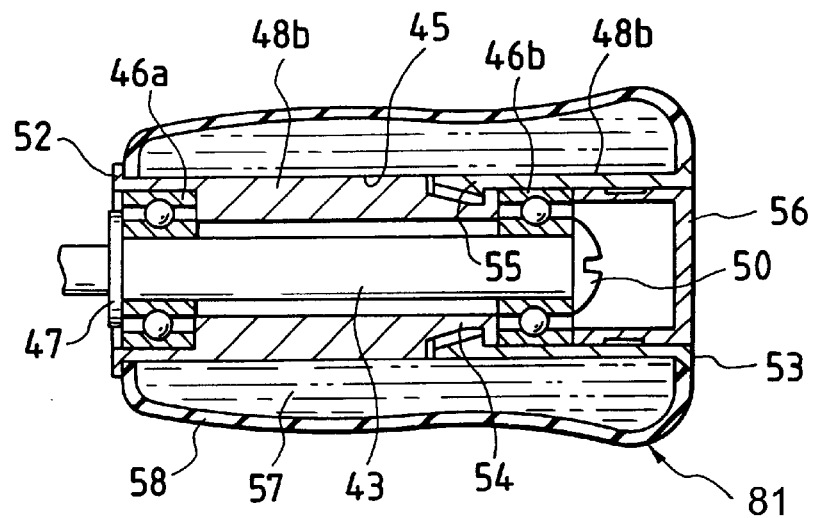
FIG. 8 is an enlarged sectional view of the part of an operation knob of a spool operation handle of a bait casting fishing reel according to a fourth embodiment of the invention.

A spool operation handle of a bait casting fishing reel according to a fourth embodiment of the invention will be discussed with reference to FIG. 8. An operation knob 81 in the spool operation handle is provided by forming the film 58 of the knob 42 of the first embodiment only on the outer peripheral surface of the main body member 57 and not on the inner face of the inner hole 45. Other points are the same as those of the first embodiment.

Fifth Embodiment

Figure 9:
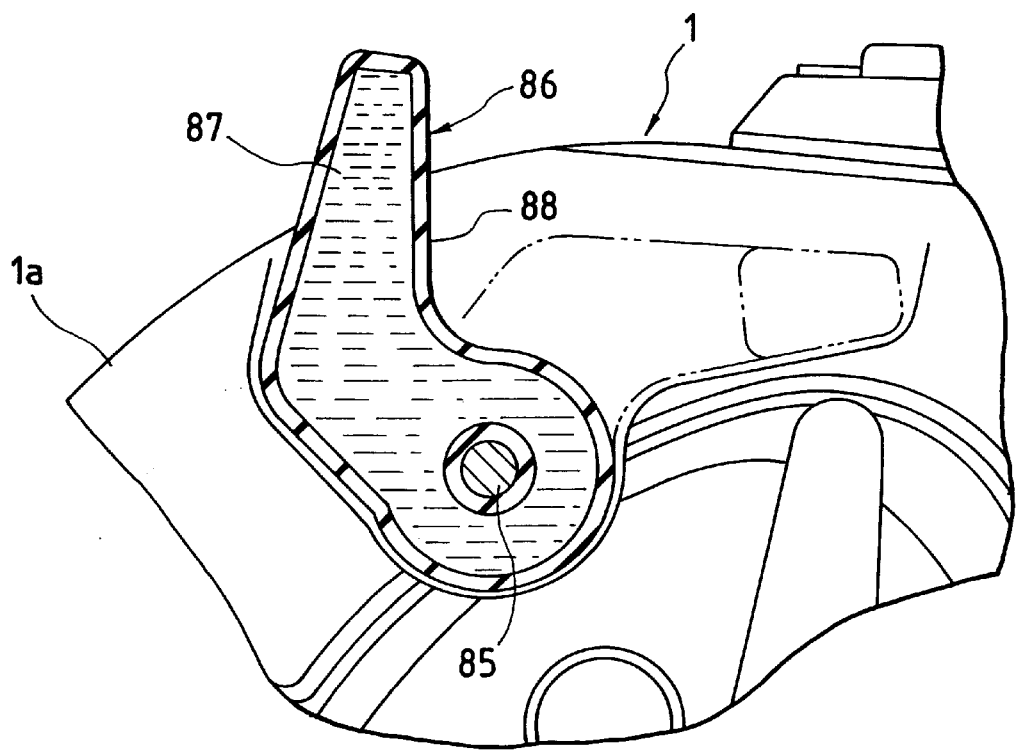
FIG. 9 is an enlarged sectional view of the part of a clutch switch operation lever of a bait casting fishing reel according to a fifth embodiment of the invention.

A clutch switch operation body in a clutch mechanism 6 of a bait casting fishing reel according to a fifth embodiment of the invention will be discussed with reference to FIG. 9. The clutch switch operation body is made of an operation lever 86 pivotally supported on an operation shaft 85 so that the tip projects to either of left and right frames 1a and 1b of a reel main body 1, for example, the right frame 1b, from the outer face thereof. Like the above-described operation body, the operation lever 86 is made up of a main body member 87 formed to a proper predetermined shape with a cork material and a waterproof film 88 with which the outer surface of the main body member 87 is coated on the whole.

Sixth Embodiment

Figure 10:
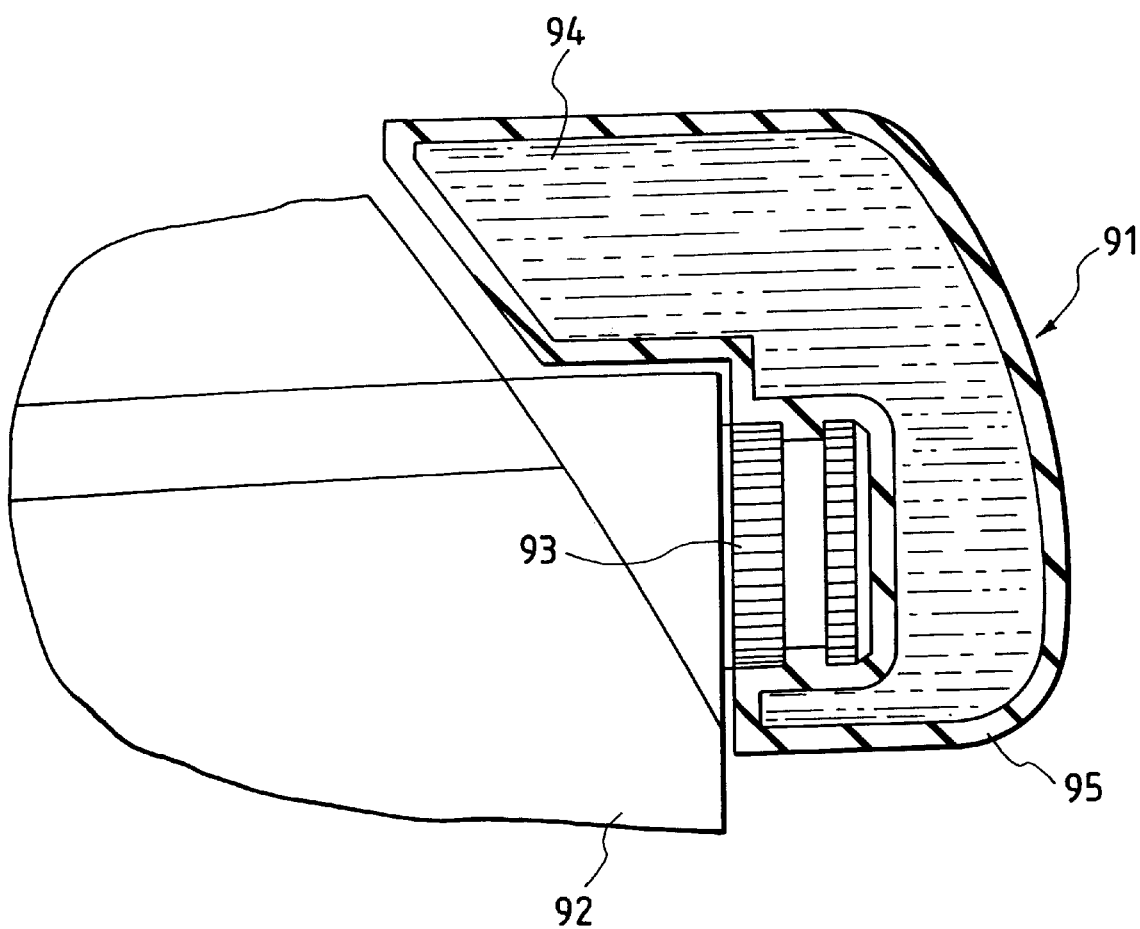
FIG. 10 is an enlarged sectional view of the part of an anti-reverse-rotation switch lever of a spinning reel according to a sixth embodiment of the invention.

A sixth embodiment of the invention will be discussed with reference to FIG. 10. An operation body in the sixth embodiment is applied to an anti-reverse-rotation switch lever 91 of a spinning reel. The anti-reverse-rotation switch lever 91 is attached to a switch operation shaft 93 of an anti-reverse-rotation mechanism disposed in a reel main body 92 of the spinning reel. Like the above-described operation body, the anti-reverse-rotation switch lever 91 is also made up of a main body member 94 formed to a proper predetermined shape with a cork material and a waterproof film 95 with which the outer surface of the main body member 94 is coated on the whole.

The operation body types to which the invention is applied are not limited to the operation bodies described above and may be other operation bodies of fishing reels, such as a drag mechanism adjustment knob.

As we have discussed, according to the invention, the operation bodies in a fishing reel are rendered lighter, thereby improving the operability thereof and the portability of the fishing reel. Further, a fishing reel which provides a good touch feeling of operation bodies and moreover can be used without a hitch even in a harsh environment in which water is easily deposited, for example, can be provided.

What is claimed is:

1. A fishing reel comprising:
    a reel main body;
    a movable member attached movably to said reel main body; and
    an operation body attached to said movable member, said operation body comprising:
       a main body member made of a cork material; and
       a protective film adhesively bonded to said main body member, for covering at least an externally exposed surface of said main body member.

2. A fishing reel according to claim 1, further comprising a spool; and
    wherein said movable member includes a handle arm driven through said operation body to wind a fishline onto said spool.

3. A fishing reel according to claim 1, further comprising:
    means for removably mounting said operation body onto said movable member.

4. A fishing reel according to claim 1, wherein:
    said main body member is treated with a hole filler; and
    an adhesive layer is interposed between said main body member and said protective film.

5. A fishing reel according to claim 1, wherein:
    said movable member includes a clutch operation plate; and
    said operation body includes a clutch operation lever.

6. A fishing reel according to claim 1, wherein:
    said movable member includes a spool having a winding barrel portion; and
    said operation body includes a spool spacer encircling the winding barrel portion of said spool.

7. A fishing reel according to claim 1, wherein:
    said movable member includes a clutch operation shaft; and
    said operation body includes a clutch switch operation body.

8. A fishing reel according to claim 1, wherein:
    said movable member includes an operation shaft of a reverse-rotation prevention mechanism; and
    said operation body includes a switch lever for said operation shaft.

* * * * *